July 30, 1968 R. M. MILLS 3,394,495
RECEPTACLE FOR GROWING PLANTS
Filed May 16, 1966
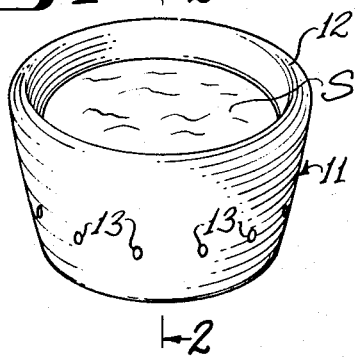
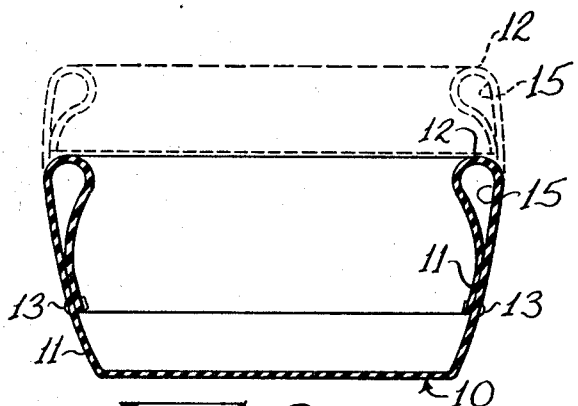
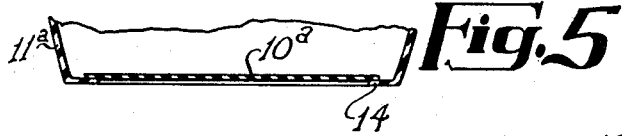
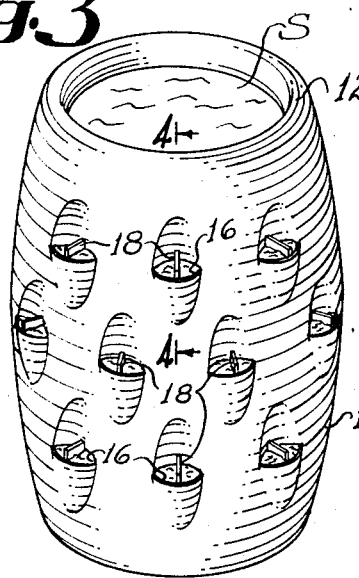
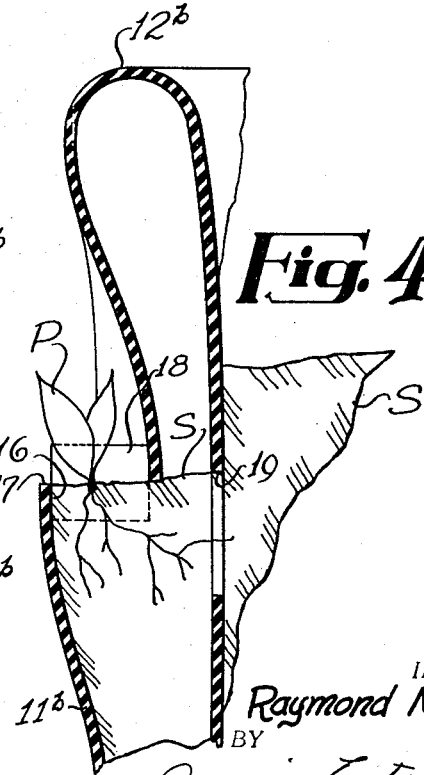
INVENTOR.
Raymond M. Mills
BY
Jennings Carter & Thompson
Attorneys United States Patent Office 3,394,495
Patented July 30, 1968

3,394,495
RECEPTACLE FOR GROWING PLANTS
Raymond M. Mills, Star Rte., Box 18,
Northport, Ala. 35476
Filed May 16, 1966, Ser. No. 550,192
2 Claims. (Cl. 47—34.12)

ABSTRACT OF THE DISCLOSURE

A receptacle for growing plants having upstanding flexible side walls with the upper portion of the side walls being foldable downwardly and inwardly alongside the inner surface thereof. A slit is provided in the side wall and a spacer member extends between opposite portions of the side wall defining the slit and an opening is provided in the portion folded downwardly and inwardly communicating the slit with the interior of the receptacle.

This invention relates to a receptacle for growing plants and more particularly to such a receptacle which shall include means for varying the effective height thereof.

An object of my invention is to provide a receptacle for growing plants which shall include a flexible, upstanding, barrel-shaped side wall connected to a bottom wall with the upper portion of the flexible side wall being adapted to fold downwardly and inwardly alongside and in spaced relation to the inner surface of an adjacent lower portion thereof whereby the height may be adjusted and an air space is provided for insulation to provide a stable temperature for the root system of plants and an upper rounded edge is provided for the receptacle.

Another object of my invention is to provide a receptacle for growing plants of the character designated which shall include means for securing the portion which is folded downwardly and inwardly of the receptacle to an adjacent lower portion thereof whereby the height of the receptacle is fixed by the securing means.

A further object of my invention is to provide a receptacle for growing plants of the character designated in which a generally horizontal slit is provided in the side wall and a spacer member extends between opposite portions of the side wall defining the slit to hold such portions in spaced relations to each other and thereby define a pocket for receiving a plant adjacent the outer surface of the receptacle.

A further object of my invention is to provide a receptacle for growing plants of the character designated which shall be extremely simple of construction, economical of manufacture and one which may utilize a waste product in the construction thereof.

Briefly, my improved receptacle for growing plants comprises a bottom wall having an upstanding, flexible, barrel-shaped side wall connected thereto. The upper portion of the flexible side wall is adapted to fold downwardly and inwardly alongside the inner surface of an adjacent lower portion thereof to vary the height of the side wall. In actual practice I have found that my improved receptacle may be formed from damaged or discarded water bags employed in the manufacture of vehicle tires.

A receptacle for growing plants embodying features of my invention is illustrated in the accompanying drawing, forming a part of this application, in which:

FIGURE 1 is a perspective view of the receptacle showing the upper portion of the side wall folded downwardly and inwardly and secured in place to determine the height thereof;

FIGURE 2 is an enlarged, sectional view taken generally along the line 2—2 of FIGURE 1;

FIGURE 3 is a perspective view showing a modified form of my invention in which pockets are formed in the upstanding wall of the receptacle for receiving plants;

FIGURE 4 is an enlarged sectional view taken generally along the line 4—4 of FIGURE 3; and, FIGURE 5 is a fragmental sectional view showing another modified form of my invention.

Referring now to the drawing for a better understanding of my invention, the receptacle comprises a bottom wall 10 which may be formed integrally with an upstanding side wall 11 that is generally barrel-shaped. The bottom wall 10 and side wall 11 are formed of a resilient, flexible material, such as rubber, whereby the upper portion thereof may be folded downwardly and inwardly, as shown in FIGURES 1 and 2, to define a rounded upper edge 12 for the receptacle. Also, the downwardly folded portion defines an air space 15 which provides for insulation to maintain a stable temperature for the plant roots.

To vary the height of the receptacle, the upper portion of the upstanding wall 11 is folded to selected positions, as shown in solid lines and dotted lines in FIGURE 2. With the upper portion folded to the desired position, securing elements 13 are inserted through the downwardly folded upper portion and the lower portion of the wall 11 adjacent thereto, as shown in FIGURE 2, thus securing the downwardly folded portion in a fixed position to determine the height of the receptacle.

While I have shown the bottom wall in FIGURE 2 as being formed integrally with the upstanding wall 11, the bottom wall may be separate from the upstanding wall 11, as shown in FIGURE 5. That is, in FIGURE 5, I show an annular, inturned flange 14 adjacent the lower end of an upstanding wall 11a which is in position to support a disc-shaped bottom wall 10a.

In FIGURES 3 and 4, I show a plurality of pockets 16 as being formed in an upstanding side wall 11b for receiving plants P. Each pocket 16 is defined by a horizontal slit 17 formed in the upstanding wall 11b. To hold opposite sides of the slit in spaced relation to each other, I insert a spacer member 18 in each slit, as shown. Preferably, the spacer member 18 is in the form of a vertical plate-like member which is of a width equal the desired width of the pocket 16 to be formed. By inserting the spacer member 18 and then filling the receptacle with soil, indicated at S, the soil aids in retaining the spacer members 18 in the vertical position while in use.

Where the inwardly folded portion of the receptacle extends downwardly along side a pocket 16, an opening 19 is provided in the downwardly folded portion in alignments with the pocket 16, as shown in FIGURE 4, whereby the soil S flows outwardly into the pocket 16. That is, the openings 19 communicate the pocket 16 with the interior of the receptacle. The upper portion of the side wall 11b is folded downwardly and inwardly to provide a rounded upper edge 12b.

From the foregoing description, the operation and useage of my improved receptacle for growing plants will be readily understood. The upper portion of the side wall 11 is folded downwardly and inwardly to the desired position to determine the height of the receptacle. The retaining elements 13 are then secured in place whereby the downwardly and inwardly extending portion is held in a fixed position relative to the lower portion of the side wall 11, as shown in FIGURE 2. The receptacle is then filled with soil S.

Where it is desired to provide pockets 16 in the exterior of the upstanding side wall 11b for receiving plants, the slits 17 are cut in the side wall 11b in spaced relation to each other, as shown in FIGURE 3. The vertically extending spacer members 18 are then inserted in each slit 17 to thus hold the material at opposite sides of the slits 17 in spaced relation to each other to define the pocket 16. Soil is then added to the receptacle whereby it flows outwardly into the pocket 16. Where the downwardly and inwardly folded portion of the receptacle extends below the slit 17 and pocket 16, an opening 19 is provided in the downwardly extending portion, as shown in FIGURE 4, to thus communicate the pocket 16 with the interior of the receptacle as described hereinabove.

From the foregoing, it will be seen that I have devised an improved receptacle for growing plants. By providing a barrel-shaped upstanding wall of a resilient, flexible material, together with the securing elements 13, the height of the receptacle may be readily varied by merely folding the upper portion thereof downwardly and inwardly and then securing the same in place by the retainer elements 13. To form the plant receiving pockets 16, one merely provides the spaced apart slits 17 in the upstanding side wall 11b and then inserts the spacer elements 18 whereupon the soil S flows outwardly to fill the pockets. Furthermore, the provision of the openings 19 in the inwardly folded portion of the receptacle provides direct communication between the pockets 16 and the interior of the receptacle.

While I have shown my invention in several forms, it will be obvious to those skilled in the art that it is not so limited, but is susceptible of various changes and modifications without departing from the spirit thereof, and I desire, therefore, that only such limitations shall be placed thereupon as are specifically set forth in the appended claims.

I claim:
1. A receptacle for growing plants comprising:
   (a) a bottom wall,
   (b) a resilient, flexible, upstanding, barrel-shaped side wall connected to said bottom wall with the upper portion of said flexible side wall being foldable downwardly and inwardly alongside the inner surface of an adjacent lower portion thereof to vary the height of said side wall,
   (c) there being at least one generally horizontal slit in said side wall,
   (d) a spacer member extending between opposite portions of said side wall defining said slit holding said opposite portions in spaced relation to each other and thereby defining a pocket for receiving a plant,
   (e) there being an opening in said portion folded downwardly and inwardly in alignment with said slit in said side wall to communicate said slit with the interior of said receptacle.
2. A receptacle for growing plants as defined in claim 1 in which said spacer member is a vertically extending plate-like member.

References Cited
UNITED STATES PATENTS

| | | | |
|---|---|---|---|
| 1,600,055 | 9/1926 | Meyer | 47—34.2 |
| 1,740,057 | 12/1929 | Babich | 47—34.12 |
| 2,253,817 | 8/1941 | Simmons | 47—34 |
| 2,956,370 | 10/1960 | Wieboldt | 47—1.2 |
| 3,038,512 | 6/1962 | Staton | 47—34 |
| 3,291,361 | 12/1966 | Commeyras | 220—74 |

FOREIGN PATENTS 717,320  2/1942  Germany.

ARAHAM G. STONE, *Primary Examiner.*

S. C. PELLEGRINO, *Assistant Examiner.*